(12) United States Patent
Nonaka

(10) Patent No.: US 7,230,397 B2
(45) Date of Patent: Jun. 12, 2007

(54) SENSORLESS MOTOR DRIVING DEVICE

(75) Inventor: Masataka Nonaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 929 days.

(21) Appl. No.: 10/132,368

(22) Filed: Apr. 26, 2002

(65) Prior Publication Data

US 2006/0076910 A1   Apr. 13, 2006

(30) Foreign Application Priority Data

Apr. 26, 2001   (JP) ............................. 2001-129899
Apr. 26, 2001   (JP) ............................. 2001-129900

(51) Int. Cl.
*H02P 6/18*   (2006.01)
*H02P 6/22*   (2006.01)

(52) U.S. Cl. ....................... 318/254; 318/430; 318/439

(58) Field of Classification Search ................ 318/138, 318/254, 430–431, 439, 720–724
See application file for complete search history.

(56) References Cited

U.S. PATENT DOCUMENTS

| | | | | |
|---|---|---|---|---|
| 4,520,302 A | * | 5/1985 | Hill et al. ................... 318/696 |
| 4,712,050 A | * | 12/1987 | Nagasawa et al. .......... 318/254 |
| 4,876,491 A | * | 10/1989 | Squires et al. .............. 318/138 |
| 4,959,596 A | * | 9/1990 | MacMinn et al. .......... 318/254 |
| 5,028,852 A | * | 7/1991 | Dunfield ..................... 318/254 |
| 5,097,190 A | * | 3/1992 | Lyons et al. ................ 318/701 |
| 5,159,246 A | * | 10/1992 | Ueki ........................... 318/254 |
| 5,191,270 A | * | 3/1993 | McCormack ............... 318/254 |
| 5,254,914 A | * | 10/1993 | Dunfield et al. ............ 318/254 |
| 5,321,342 A | * | 6/1994 | Kruse .......................... 318/254 |
| 5,327,053 A | * | 7/1994 | Mann et al. ................ 318/254 |
| 5,530,326 A | * | 6/1996 | Galvin et al. ............... 318/254 |
| 5,798,623 A | * | 8/1998 | El-Sadi ....................... 318/254 |
| 6,731,086 B2 | * | 5/2004 | Nonaka ....................... 318/459 |

* cited by examiner

*Primary Examiner*—Bentsu Ro
(74) *Attorney, Agent, or Firm*—Morgan, Lewis & Bockius LLP

(57) ABSTRACT

In a sensorless motor driving device for driving a motor by controlling the energization of the coils of individual phases of the motor according to the result of detecting the position of the rotor of the motor without using an external sensor, before the motor is started, which phase to energize first when the motor is started is determined according to the result of detecting the position in which the rotor is at rest by exploiting the fact that the coils of the individual phases have varying apparent inductances according to the position in which the rotor is at rest. This circuit configuration permits the motor to be started always in the same rotation direction, and thus prevents reverse rotation of the motor.

1 Claim, 13 Drawing Sheets

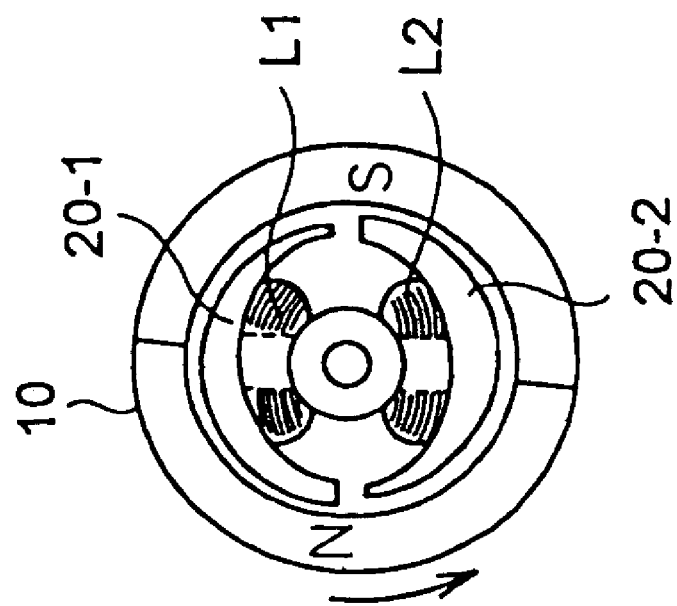
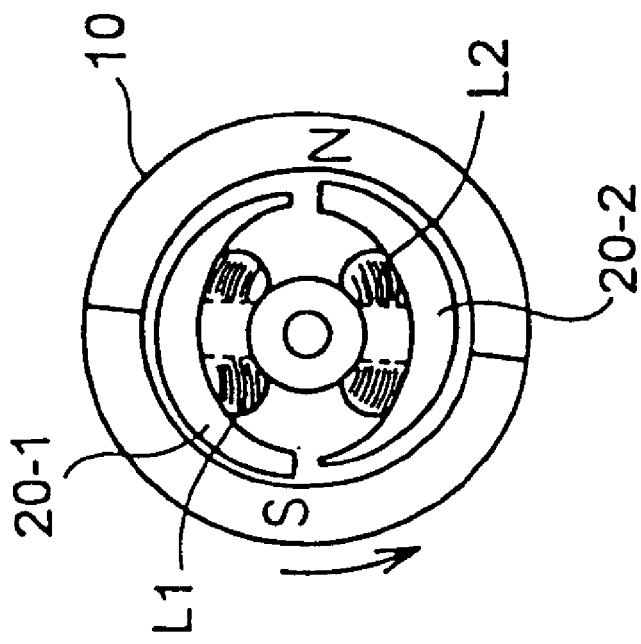

SENSORLESS MOTOR DRIVING DEVICE

BACKGROUND OF THE INVENTION

Field of the Invention

The present invention relates to a sensorless motor driving device for driving motor by detecting the position of the rotor of the motor without using an external sensor such as a Hall element and controlling the energization of the coils of individual phases of the motor according to the result of the detection.

First, taking up a two-phase half-wave motor driving device as an example, prior art will be described. FIG. 15 shows a block diagram of a conventional, common two-phase half-wave motor driving device 100'. A Hall element H is arranged so as to face a rotor of a motor M. A comparator 101 outputs a binary signal that represents the relationship in magnitude between the voltages output from both ends of the Hall element H. A commutation portion 102, according to the binary signal output from the comparator portion 101, devices which of two transistors T1 and T2, which together constitute an output portion 104, to turn on, and outputs a logic signal to be fed to the gates of the transistors T1 and T2.

The signal output from the commutation portion 102 is converted, by a pre-drive portion 103, to a level high enough to turn on and off the transistors T1 and T2, and is then fed to the gates of the transistors T1 and T2. In the output portion 104, an n-channel MOS field-effect transistor T1 is connected between one end of a first-phase coil L1, of which the other end is connected to a drive voltage $V_M$ for the motor M, and ground. Moreover, an n-channel MOS field-effect transistor T2 is connected between one end of a second-phase coil L2, of which the other end is connected to the drive voltage $V_M$ for the motor M, and ground.

The signal output from the Hall element H represents the position of the rotor. Thus, with the circuit configuration described above, it is possible to switch which phase to energize with appropriate timing according to the position of the rotor, and thereby rotate the rotor smoothly.

The problem with this conventional, common two-phase half-wave motor driving device is that it requires an external sensor (Hall element) to detect the position of the rotor. This has been hindering cost reduction and miniaturization. The inventor of the present application has once proposed, in another application, a sensorless driving method for driving a motor by detecting the position of the rotor of the motor according to a back electromotive force appearing in the coil of each phase of the motor as the rotor rotates and switching which phase to energize according to the result of the detection. However, in this sensorless driving method, when the rotor is at rest, no back electromotive force appears in the coil of each phase, and therefore the position of the rotor cannot be detected. Thus, simply applying a drive signal to the motor when it is started may cause, quite inconveniently, the motor to start rotating in the reverse direction.

SUMMARY OF THE INVENTION

An object of the present invention is to provide a sensorless motor driving device that prevents reverse rotation of a motor.

To achieve the above object, according to the present invention, in a sensorless motor driving device for driving a motor by controlling the energization of the coils of individual phases of the motor according to the result of detecting the position of the rotor of the motor without using an external sensor, before the motor is started, which phase to energize first when the motor is started is determined according to the result of detecting the position in which the rotor is at rest by exploiting the fact that the coils of the individual phases have varying apparent inductances according to the position in which the rotor is at rest.

By determining, in this way, which phase to energize first when the motor is started according to the position in which the rotor is at rest, it is possible to start the motor always in the same rotation direction and thereby prevent reverse rotation of the motor.

Here, the coils of the individual phases have varying apparent inductances according to the position in which the rotor is at rest, and therefore the waveforms with which currents start flowing through the coils of the individual phases when they start being energized vary from phase to phase. Thus, for example, by energizing the coils of the individual phases to such a degree as not to cause the rotor to start rotating and then comparing the waveforms with which currents start flowing through those coils, it is possible to detect the position in which the rotor is at rest.

BRIEF DESCRIPTION OF THE DRAWINGS

This and other objects and features of the present invention will become clear from the following description, taken in conjunction with the preferred embodiments with reference to the accompanying drawings in which:

FIGS. 5A and 5B are diagrams showing the structure of a motor targeted in this embodiment;

DESCRIPTION OF THE PREFERRED EMBODIMENTS

Figure 1:
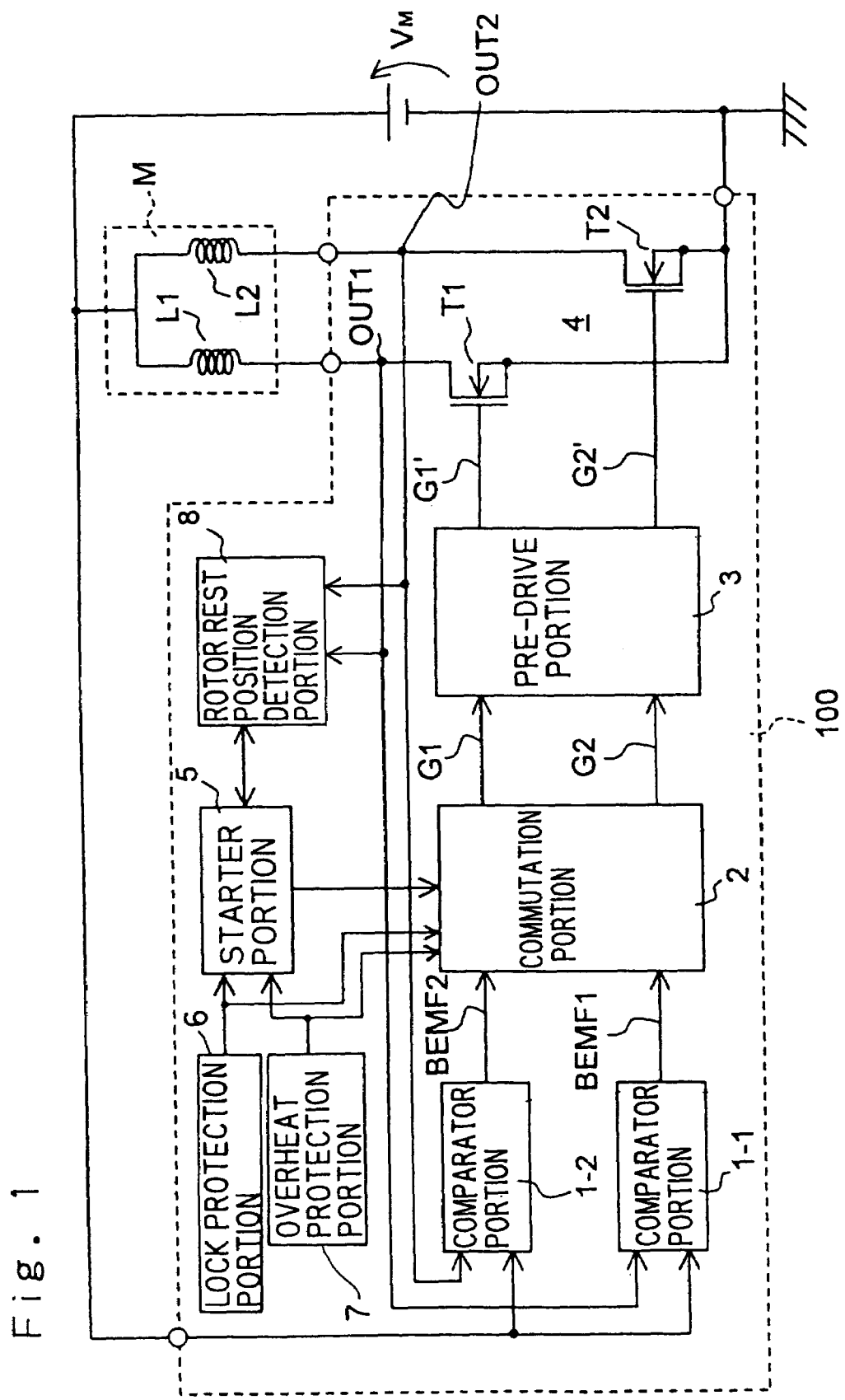
FIG. 1 is a block diagram of a two-phase half-wave fan motor driving device embodying the invention.

Hereinafter, embodiments of the present invention will be described with reference to the drawings. FIG. 1 is a block diagram of a two-phase half-wave fan motor driving device 100 embodying the invention which is designed for the driving of a two-phase half-wave motor used as a fan motor. In this figure, reference numerals 1-1 and 1-2 represent respectively a first and a second comparator portion, reference numeral 2 represents a commutation portion, reference numeral 3 represents a pre-drive portion, reference numeral 4 represents an output portion, reference numeral 5 represents a starter portion, reference numeral 6 represents a lock protection portion, reference numeral 7 represents an overheat protection portion, and reference numeral 8 represents a rotor rest position detection portion. Reference symbols L1 and L2 represent respectively a first-phase coil and a second-phase coil of a motor M.

The comparator portion 1-1 outputs a binary signal BEMF1 that represents the relationship in magnitude between the voltage at the output point OUT1 for the first phase (i.e. the node between the first-phase coil L1 and a transistor T1 included in the output portion 4) and a driving voltage $V_M$ for the motor M. The comparator portion 1-2 outputs a binary signal BEMF2 that represents the relationship in magnitude between the voltage at the output point OUT2 for the second phase (i.e. the node between the second-phase coil L2 and a transistor T2 included in the output portion 4) and the driving voltage $V_M$ for the motor M.

The commutation portion 2, according to the signals BEMF1 and BEMF2 output respectively from the comparator portions 1-1 and 1-2, produces and outputs signals G1 and G2 by which the transistors T1 and T2 constituting the output portion 4 are respectively turned on and off in such a way that the rotor of the motor rotates smoothly.

The pre-drive portion 3 performs level conversion on the signals G1 and G2 output from the commutation portion 2 to make their levels high enough to turn on and off the transistors T1 and T2 constituting the output portion 4, and then feeds those signals to the gates of the transistors T1 and T2.

The output portion 4 is composed of an n-channel MOS field-effect transistor T1 connected between one end of the first-phase coil L1, of which the other end is connected to the drive voltage $V_M$ for the motor M, and ground and an n-channel MOS field-effect transistor T2 connected between one end of the second-phase coil L2, of which the other end is connected to the drive voltage $V_M$ for the motor M, and ground.

The starter portion 5 starts the motor M by energizing first the phase determined according to the result of detection by the rotor rest position detection portion 8. How this is achieved in practice will be described later. On the basis of the output signals from the comparator portions 1-1 and 1-2 and the internal signals within the commutation portion 2, the lock protection portion 6 checks whether the motor is locked or not (for example, when those signals remain unchanged for a predetermined period, the motor is recognized to be locked). If the motor continues being driven in the locked state, the motor and the driving device will be destroyed. To prevent this, when the motor is recognized to be locked, the lock protection portion 6 de-energizes the coils of both phases of the motor and, a predetermined period thereafter, makes the starter portion 5 restart the motor. The overheat protection portion 7 prevents thermal runaway by monitoring the ambient temperature and, when the monitored temperature exceeds a predetermined level, de-energizing the coils of both phases of the motor.

Before the motor M is started, the rotor rest position detection portion 8 detects the position in which the rotor of the motor is at rest by exploiting the fact that the first-phase coil L1 and the second-phase coil L2 have varying apparent inductances according to the position in which the rotor is at rest. On the basis of the result of this detection, which of the first-phase and second-phase coils to energize first when the motor M is started is determined.

Figure 2:
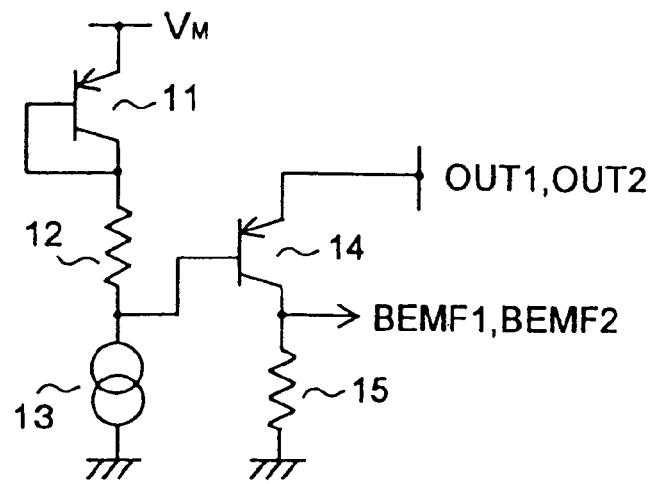
FIG. 2 is a diagram showing a practical example of the circuit configuration of the comparator portions.

FIG. 2 shows a practical example of the circuit configuration of the comparator portions 1-1 and 1-2. A pnp-type transistor 11 has its emitter connected to the drive voltage $V_M$ for the motor M, and has its base and collector connected together. A resistor 12 is connected, at one end, to the collector of the transistor 11 and, at the other end, to one end of a constant-current circuit 13, which is grounded at the other end. A pnp-type transistor 14 has its base connected to the node between the resistor 12 and the constant-current circuit 13, has its emitter connected to the output point of the corresponding phase (i.e. to the output point OUT1 of the first phase in the case of the comparator portion 1-1, and to the output point OUT2 of the second phase in the case of the comparator portion 1-2), and has its collector connected to one end of a resistor 15, which is grounded at the other end. The node between the collector of the transistor 14 and the resistor 15 serves as the output terminal at which the signal BEMF1 or BEMF2 appears.

In this circuit configuration, if variations in the base-emitter forward voltage of the transistors 11 and 14 are ignored, when the voltages at the output points OUT1 and OUT2 of the first and second phases are higher than threshold voltages that are lower than the drive voltage $V_M$ for the motor M by the voltage drop across the resistor 12, the transistor 14 turns on, and thus the signals BEMF1 and BEMF2 respectively turn to a high level. On the other hand, when those voltages are not higher than the threshold voltages, the transistor 14 turns off, and thus the signals BEMF1 and BEMF2 respectively turn to a low level. The voltage drop across the resistor 12 is set to be so small that the threshold voltages are substantially equal to the drive voltage $V_M$ for the motor M.

Figure 3:
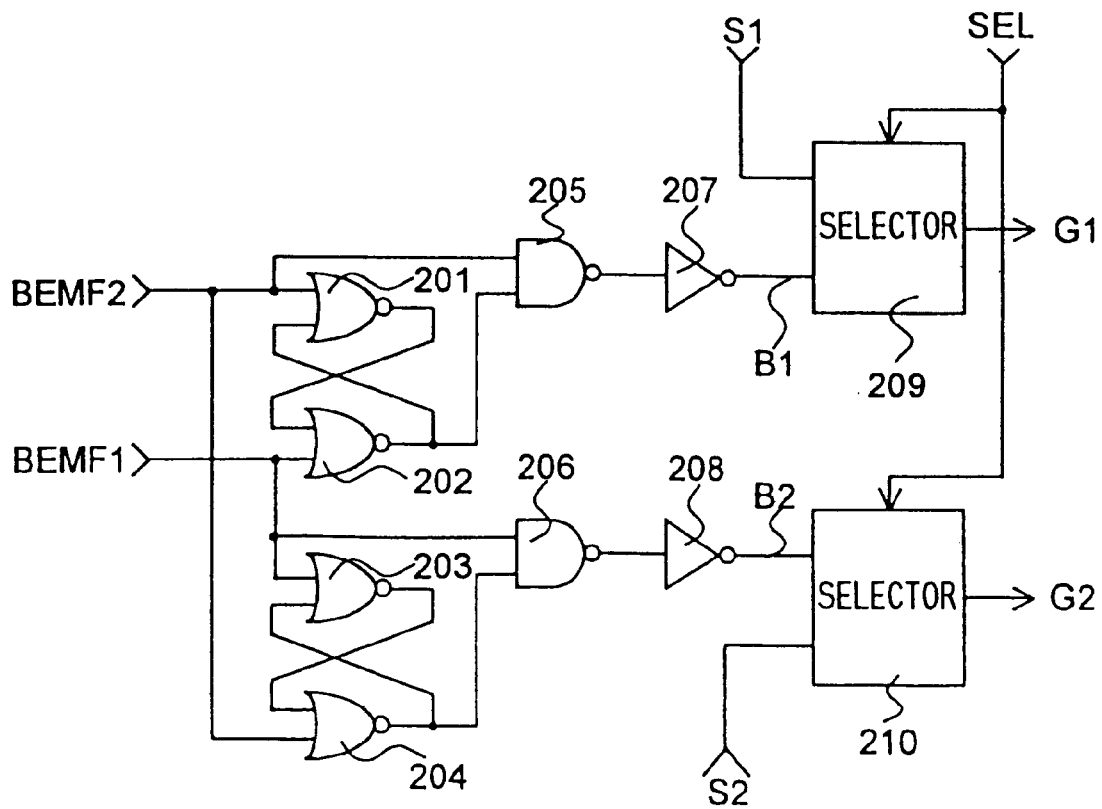
FIG. 3 is a diagram showing a practical example of the circuit configuration of the commutation portion.

FIG. 3 shows a practical example of the circuit configuration of the commutation portion 2. As shown in this figure, the commutation portion 2 is composed of NOR circuits 201, 202, 203, and 204, NAND circuits 205 and 206, NOT circuits (inverter circuits) 207 and 208, and selectors 209 and 210. These are interconnected as follows.

Between the NOR circuits 201 and 202, the output terminal of one is connected to one of the input terminals of the other so as to form an RS flip-flop circuit. The NOR circuit 201 receives, at the other input terminal, the signal BEMF2 output from the comparator portion 1-2, and the NOR circuit 202 receives, at the other input terminal, the signal BEMF1 output from the comparator portion 1-1.

The NAND circuit 205 receives, at one input terminal, the signal BEMF2 output from the comparator portion 1-2 and, at the other input terminal, the output of the NOR circuit 202. The output terminal of the NAND circuit 205 is connected to the input terminal of the NOT circuit 207.

Between the NOR circuits 203 and 204, the output terminal of one is connected to one of the input terminals of the other so as to form an RS flip-flop circuit. The NOR circuit 203 receives, at the other input terminal, the signal BEMF1 output from the comparator portion 1-1, and the NOR circuit 204 receives, at the other input terminal, the signal BEMF2 output from the comparator portion 1-2.

The NAND circuit 206 receives, at one input terminal, the signal BEMF1 output from the comparator portion 1-1 and, at the other input terminal, the output of the NOR circuit 204. The output terminal of the NAND circuit 206 is connected to the input terminal of the NOT circuit 208.

As a result, the signals BEMF1 and BEMF2 output respectively from the comparator portions 1-1 and 1-2 and the back electromotive force drive signals B1 and B2 output respectively from the NOT circuits 207 and 208 have a relationship as shown in Table 1; that is, the signals B1 and B2 are never at a high level at the same time. Thus, the transistors T1 and T2 of the output portion 4 are never on together. In Table 1, "1" represents a high level, and "0" represents a low level.

The selector 209 receives the back electromotive force drive signal B1 output from the NOT circuit 207 and a starting signal S1 output from the starter portion 5. The selector 209 selects one of these two signals according to a select signal SEL output from the starter portion 5, and outputs the selected signal. Specifically, the selector 209 outputs the starting signal S1 when the select signal SEL is at a low level, and outputs the back electromotive force drive signal B1 when the select signal SEL is at a high level.

The selector 210 receives the back electromotive force drive signal B2 output from the NOT circuit 208 and a starting signal S2 output from the starter portion 5. The selector 210 selects one of these two signals according to the select signal SEL output from the starter portion 5, and outputs the selected signal. Specifically, the selector 210 outputs the starting signal S2 when the select signal SEL is at a low level, and outputs the back electromotive force drive signal B2 when the select signal SEL is at a high level.

The selectors 209 and 210 respectively output signals G1 and G2, which are fed to the pre-drive portion 3, where they are subjected to level conversion to be converted into signals G1' and G2', which are fed to the gates of the transistors T1 and T2 constituting the output portion 4.

Figure 4:
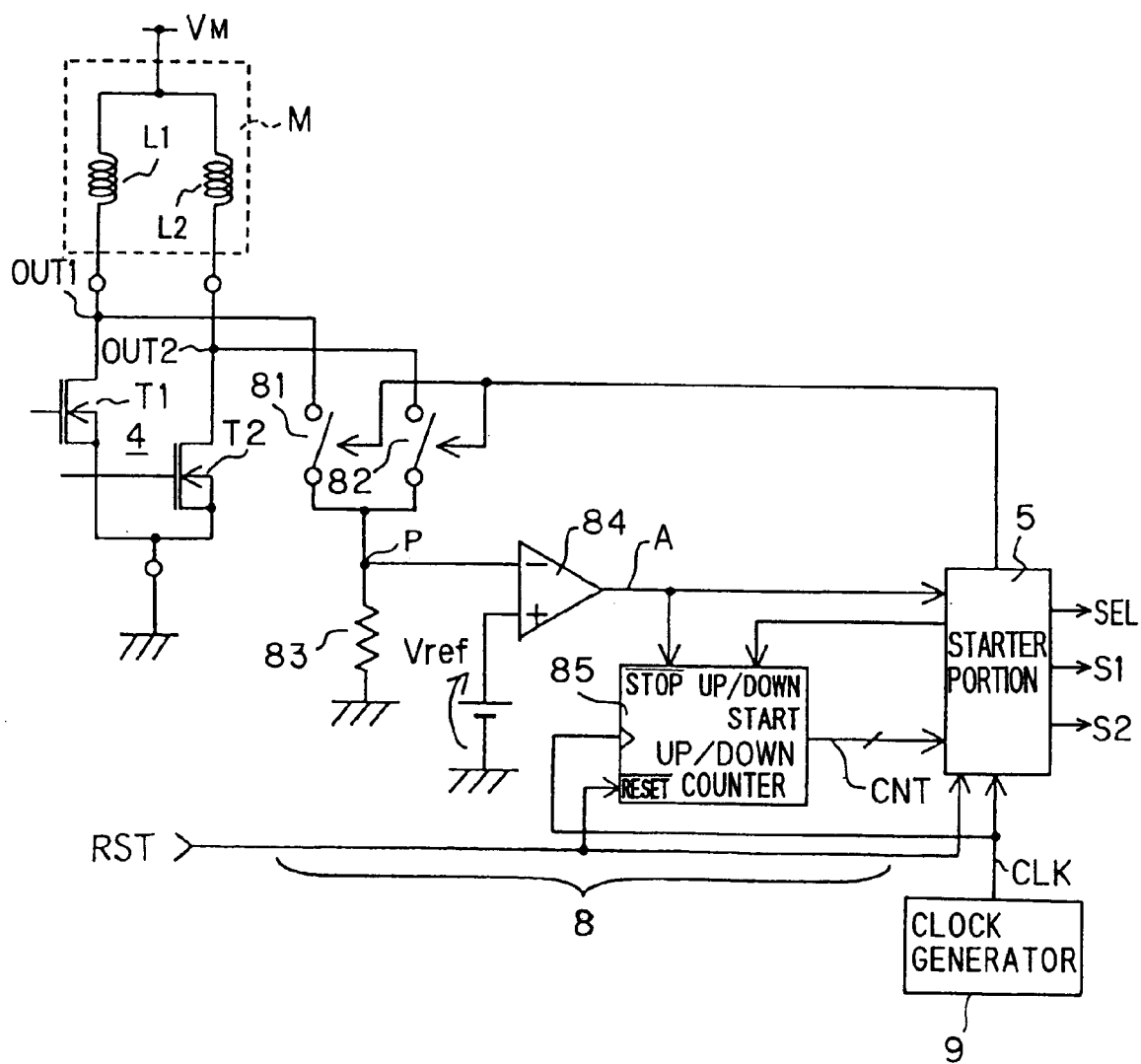
FIG. 4 is a diagram showing a practical example of the circuit configuration of the rotor rest position detection portion.

FIG. 4 shows a practical example of the circuit configuration of the rotor rest position detection portion 8. In this example, the rotor rest position detection portion 8 is composed of a switch 81 of which one end is connected to the output point OUT1 of the first phase, a switch 82 of which one end is connected to the output point OUT2 of the second phase, a resistor 83 of which one end is connected to the other end of both the switches 81 and 82 and of which the other end is grounded, a comparator 84 of which the non-inverting input terminal (+) is connected to a reference voltage $V_{ref}$ and of which the inverting input terminal (−) is connected to the node P at which the switches 81 and 82 and the resistor 83 are connected together, and an up/down counter 85. The resistor 83 is given a resistance so high that, even when the switches 81 and 82 are turned on, the current flowing through the resistor 83 is so low that the rotor does not rotate.

When instructed by the starter portion 5 to start counting up, the up/down counter 85 starts incrementing its output value CNT, starting with zero, by one every time a clock signal CLK generated by a clock generator 9 rises (this operation will be referred to as the "count-up operation").

When instructed to start counting down, the up/down counter 85 starts decrementing its output value CNT by one every time the clock signal CLK rises (this operation will be referred to as the "count-down operation"). Once the count-up or count-down operation is started, it is continued until stopped on a trailing edge in a signal A output from the comparator 84. The up/down counter 85, when its output value becomes equal zero in the count-down operation, thereafter keeps it at zero, ignoring the following rising edges in the clock signal CLK.

Here, it is assumed that the coil of the phase that is being energized produces a magnetic field of the S pole. Then, in general, whichever of the first-phase and second-phase coils L1 and L2 is closer to the S pole of the rotor has a higher apparent inductance, and therefore the current flowing through that coil varies more gently. Thus, in a case where the coil L2 is closer to the S pole of the rotor, the length of time required for the signal A output from the comparator 84 to turn from a high level to a low level when the switches 81 and 82 are turned on individually is longer when the switch 82 is turned on than when the switch 81 is turned on. By contrast, in a case where the coil L1 is closer to the S pole of the rotor, the aforementioned length of time is longer when the switch 81 is turned on than when the switch 82 is turned on.

Before the motor M is started, the starter portion 5 turns the switch 81 on and the switch 82 off, and instructs the up/down counter 85 to start counting up. Thereafter, when the voltage at the node P becomes higher than the reference voltage $V_{ref}$ and thus the signal A output from the comparator 84 falls, the starter portion 5 turns the switch 81 off and the switch 82 on, and instructs the up/down counter 85 to start counting down.

Then, according to whether the output value CNT of the up/down counter 85 is equal to (i.e. has reached) zero or not on the next trailing edge in the signal A output from the comparator 84, which of the first-phase and second-phase coils L1 and L2 to energize first to start the motor M is determined. Specifically, when the output value of the up/down counter 85 is zero, the motor M is started by energizing the second-phase coil L2 first; by contrast, when the output of the up/down counter 85 is not zero (has not reached zero), the motor M is started by energizing the first-phase coil L1 first.

In this embodiment, the two-phase half-wave motor used as the target to be driven is so structured that, as shown in FIGS. 5A and 5B, the air gaps between the stators 20-1 and 20-2 and the rotor 10 are made narrower and narrower in the direction of rotation indicated by arrows so that those air gaps have different widths at different points. The rotor 10 comes to rest in a position where the air gaps are narrowest right at the N and S poles of the magnet of the rotor 10. Accordingly, when the rotor 10 is at rest, it is either in the state shown in FIG. 5A or in the state shown in FIG. 5B. Moreover, as described earlier, it is assumed that the coil of the phase that is being energized produces a magnetic field of the S pole. That is, when the coil of the phase that is located closer to the S pole of the rotor 10 is energized first, the rotor 10 starts rotating in the normal rotation direction indicated by the arrows. It is to be understood that, although the magnet is provided on the part of the rotor and the coils are provided on the part of the stators in this embodiment, it is also possible to provide instead the magnet on the part of a stator and the coils on the part of a rotor.

Figure 6:
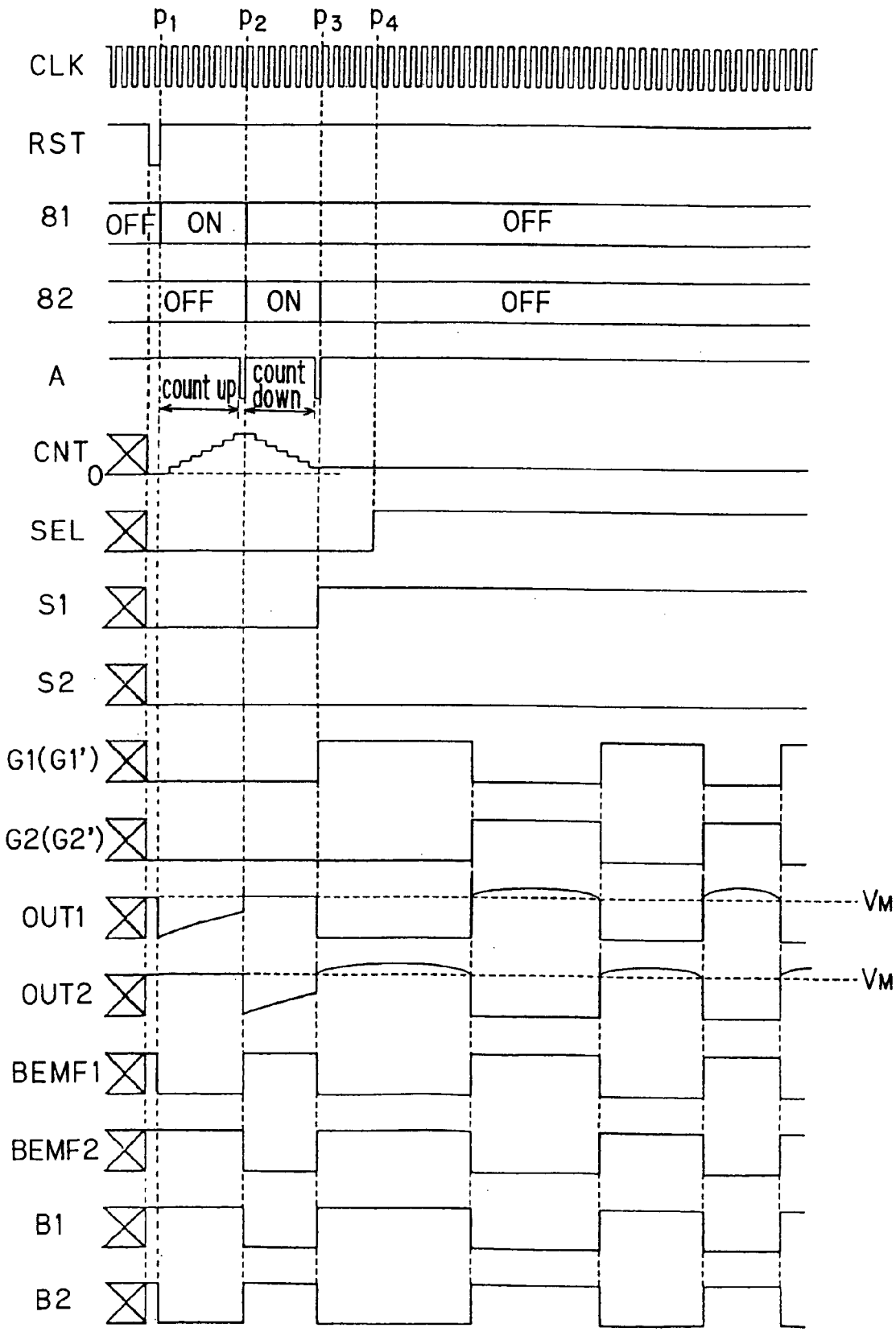
FIG. 6 is a timing chart of relevant signals observed when the motor is started, in a case where the rotor rest position detection portion is configured as shown in FIG. 4.

When the rotor rest position detection portion 8 configured as shown in FIG. 4 is used, relevant signals behave as shown in a timing chart in FIG. 6 when the motor M is started. When an internal reset signal RST turns to a low level as a result of power-on resetting, the starter portion 5 turns the select signal SEL and the starting signals S1 and S2 to a low level. Then, at a time point pi in FIG. 6, the starter portion 5 turns the switches 81 and 82 of the rotor rest position detection portion 8 on and off, respectively, and instructs the up/down counter 85 to start counting up. It is to be noted that, although the output value CNT of the up/down counter 85 is shown as varying voltage levels in FIG. 6 for easy understanding, it instead may be a binary signal that represents either zero or larger than zero.

As a result, the output value CNT of the up/down counter 85 starts being incremented by one at a time in synchronism with the clock signal CLK, and the input voltage to the inverting input terminal (−) of the comparator 84 starts rising. When the input voltage to the inverting input terminal (−) of the comparator 84 becomes higher than the reference voltage $V_{ref}$ and the signal A output from the comparator 84 turns from a high level to a low level, the up/down counter 85 stops operating.

Thereafter, the starter portion 5 turns the switches 81 and 82 off and on, respectively, and instructs the up/down counter 85 to start counting down (at a time point P2 in FIG. 6). As a result, the output value CNT of the up/down counter 85 starts being decremented by one at a time in synchronism with the clock signal CLK. Meanwhile, the input voltage to the inverting input terminal (−) of the comparator 84 first falls to the ground level and then starts rising again. When the input voltage to the inverting input terminal (−) of the comparator 84 becomes higher than the reference voltage $V_{ref}$ and the signal A output from the comparator 84 turns from a high level to a low level, the up/down counter 85 stops operating.

At this point, the count value CNT of the up/down counter 85 is not equal to zero in a case where the first-phase coil L1 is closer to the S pole of the rotor than the second-phase coil L2 is, because then the current through the first-phase coil L1 rises more slowly than the current through the second-phase coil L2. By contrast, the count value CNT is equal to zero in a case where the second-phase coil L2 is closer to the S pole of the rotor than the first-phase coil L1 is, because then the current through the second-phase coil L2 rises more slowly than the current through the first-phase coil L1.

In the case shown in FIG. 6, the output value CNT of the up/down counter 85 is not equal to zero, meaning that the first-phase coil L1 is closer to the S pole of the rotor than the second-phase coil L2 is (the state shown in FIG. 5A). Accordingly, the starter portion 5 turns the switch 82 off, simultaneously turns the starting signal S1 to a high level (at a time point $p_3$ in FIG. 6), and thereafter turns the select signal SEL to a high level (at a time point $p_4$ in FIG. 6).

As a result, the transistor T1 of the output portion 4 turns on first, and thus the first-phase coil L1, which is closer to the S pole of the rotor, is energized first, causing the rotor to start rotating in the normal rotation direction. Thereafter, the turning on and off of the transistors T1 and T2 of the output portion 4 is controlled respectively by the back electromotive force drive signals B1 and B2, and thus which phase to energize is switched every time the voltage at the output point of the phase that is not being energized falls below the drive voltage $V_M$ for the motor M (more precisely, the threshold voltage of the corresponding comparator portion), in other words, substantially at zero-cross points of the back electromotive force appearing in the coil of the phase that is not being energized as the rotor rotates. Thus, the rotation of the motor is maintained.

By contrast, in a case where the output value CNT of the up/down counter 85 is equal to zero, this means that the second-phase coil L2 is closer to the S pole of the rotor than the first-phase coil L1 is (the state shown in FIG. 5B). Accordingly, the starter portion 5 turns the starting signal S2 to a high level, and thereafter turns the select signal SEL to a high level.

As a result, the transistor T2 of the output portion 4 turns on first, and thus the second-phase coil L2, which is closer to the S pole of the rotor, is energized first, causing the rotor to start rotating in the normal rotation direction. Thereafter, the turning on and off of the transistors T1 and T2 of the output portion 4 is controlled respectively by the back electromotive force drive signals B1 and B2, and thus which phase to energize is switched every time the voltage at the output point of the phase that is not being energized falls below the drive voltage $V_M$ for the motor M (more precisely, the threshold voltage of the corresponding comparator portion), in other words, substantially at zero-cross points of the back electromotive force appearing in the coil of the phase that is not being energized as the rotor rotates. Thus, the rotation of the motor is maintained.

After the motor M is started in this way, the operation of the comparator 84 and the up/down counter 85 of the rotor rest position detection portion 8 shown in FIG. 4 may be stopped. This helps reduce power consumption. The time difference resulting from the difference between the waveforms with which currents start flowing through the first-phase and second-phase coils L1 and L2 is in the range from several microseconds to several tens of microseconds, and therefore the frequency of the clock signal CLK generated by the clock generator 9 needs to be of the order of MHz. However, in cases where no such high-frequency clock is needed once the motor has been started, the frequency of the clock signal CLK generated by the clock generator 9 may be lowered, or the operation of the clock generator 9 may be stopped until the clock signal CLK is needed again. This helps further reduce power consumption.

The rotor rest position detection portion 8 is provided with the up/down counter 85, and the lock protection portion 6 requires a counter to measure time. Whereas the rotor rest position detection portion 8 has only to operate when the motor is started, the lock protection portion 6 need not operate when the motor is started. Therefore, a single counter may be shared between the lock protection portion 6 and the rotor rest position detection portion 8. This helps minimize the increase in the circuit scale and the increase in costs.

In practical terms, it is preferable that the rotor rest position detection portion 8 shown in FIG. 4 be provided with a switch connected between the node P and ground so that this switch is turned on as required to ensure that the potential at the node P has fallen to the ground level before the switches 81 and 82 are individually turned on. This permits the position in which the rotor is at rest to be detected with higher accuracy.

Figure 7:
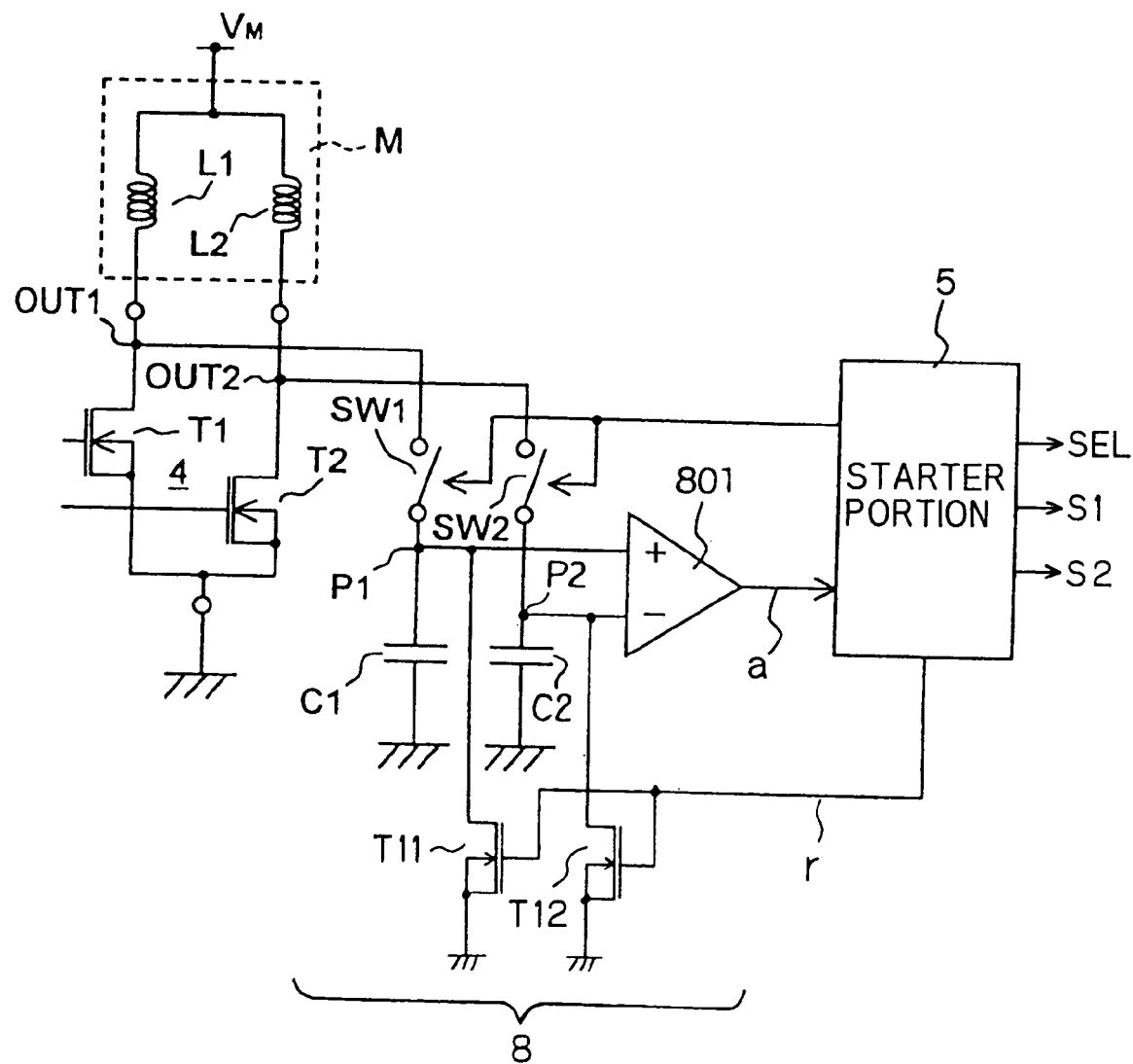
FIG. 7 is a diagram showing another practical example of the circuit configuration of the rotor rest position detection portion.

FIG. 7 shows another practical example of the circuit configuration of the rotor rest position detection portion 8. In this example, the rotor rest position detection portion 8 is composed of capacitors C1 and C2 each grounded at one end, a switch SW1 connected between the output point OUT1 of the first phase and the other end of the capacitor C1, a switch SW2 connected between the output point OUT2 of the second phase and the other end of the capacitor C2, a comparator 801 of which the non-inverting input terminal (+) is connected to the node P1 between the switch SW1 and the capacitor C1 and of which the inverting input terminal (−) is connected to the node P2 between the switch SW2 and the capacitor C2, an n-channel MOS field-effect transistor T11 of which the drain is connected to the node P1 between the switch SW1 and the capacitor C1 and of which the source is grounded, and an n-channel MOS field-effect transistor T12 of which the drain is connected to the node P2 between the switch SW2 and the capacitor C2 and of which the source is grounded.

Figure 8:
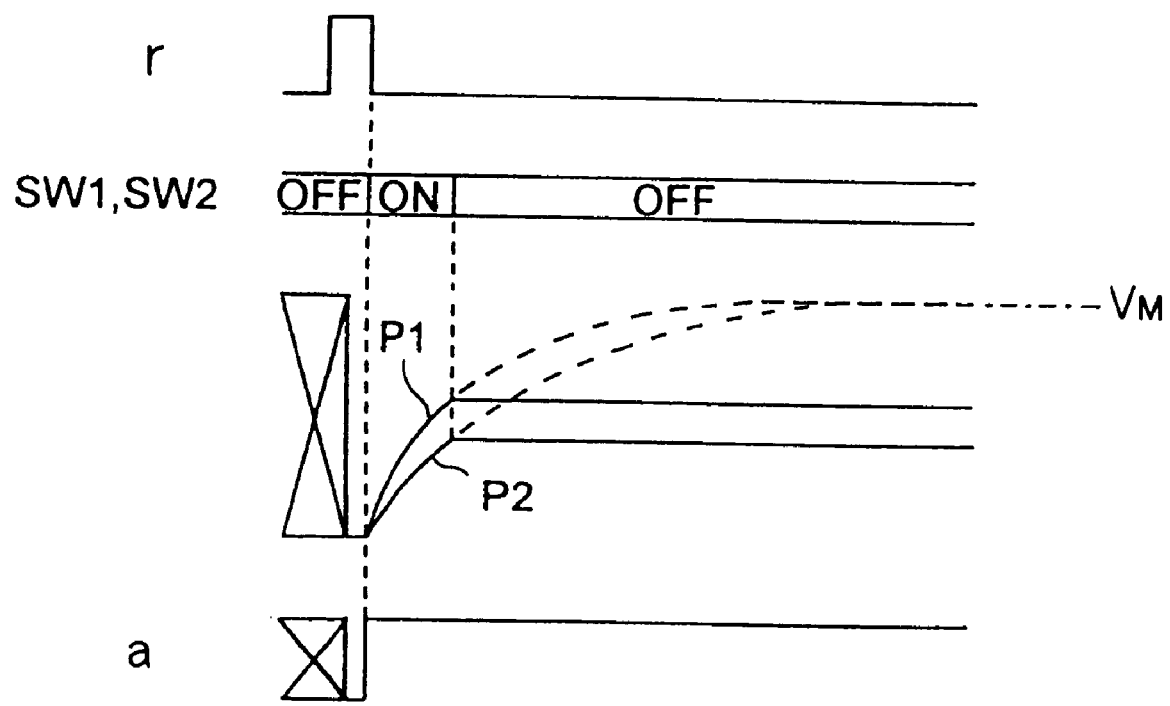
FIG. 8 is a diagram showing an example of status change that occurs at relevant points when the two switches are turned on simultaneously in FIG. 7.

Here, it is assumed that the coil of the phase that is being energized produces a magnetic field of the S pole. Then, whichever of the first-phase and second-phase coils L1 and L2 is closer to the S pole of the rotor has a higher apparent inductance, and therefore the current flowing through that coil varies more gently. Thus, in a case where the coil L2 is closer to the S pole of the rotor, when first the capacitors C1 and C2 are discharged and then the switches SW1 and SW2 are turned on simultaneously, the potential at the node P2 between the switch SW2 and the capacitor C2 rises more slowly than the potential at the node P1 between the switch SW1 and the capacitor C1 as shown in FIG. 8. Thus, at any time point before the capacitors C1 and C2 are fully charged, the potential at the node P2 is lower than the potential at the node P1, and thus the signal "a" output from the comparator 801 is at a high level. It is to be noted that the switches SW1 and SW2 are kept on only for a period of time so short as not to cause the rotor to change its position.

By contrast, in a case where the coil L1 is closer to the S pole of the rotor, when the switches SW1 and SW2 are turned on simultaneously, the potential at the node P1 rises more slowly than the potential at the node P2, and thus the signal "a" output from the comparator 801 is at a low level.

The turning on and off of the switches SW1 and SW2 and of the transistors T11 and T12 is controlled by the starter portion 5. The signal "a" output from the comparator 801 is fed to the starter portion 5. Before the motor M is started, the starter portion 5 turns the transistors T11 and T12 on momentarily to discharge the capacitors C1 and C2 respectively, and then turns the switches SW1 and SW2 on simultaneously.

Then, according to whether the signal "a" output from the comparator 801 turns to a high or low level, the starter portion 5 determines which of the first-phase and second-phase coils L1 and L2 to energize first to start the motor M. Specifically, when the signal "a" turns to a high level, the starter portion 5 starts the motor M by energizing the second-phase coil L2 first; by contrast, when the signal "a" turns to a low level, the starter portion 5 starts the motor M by energizing the first-phase coil L1 first.

Figure 9:
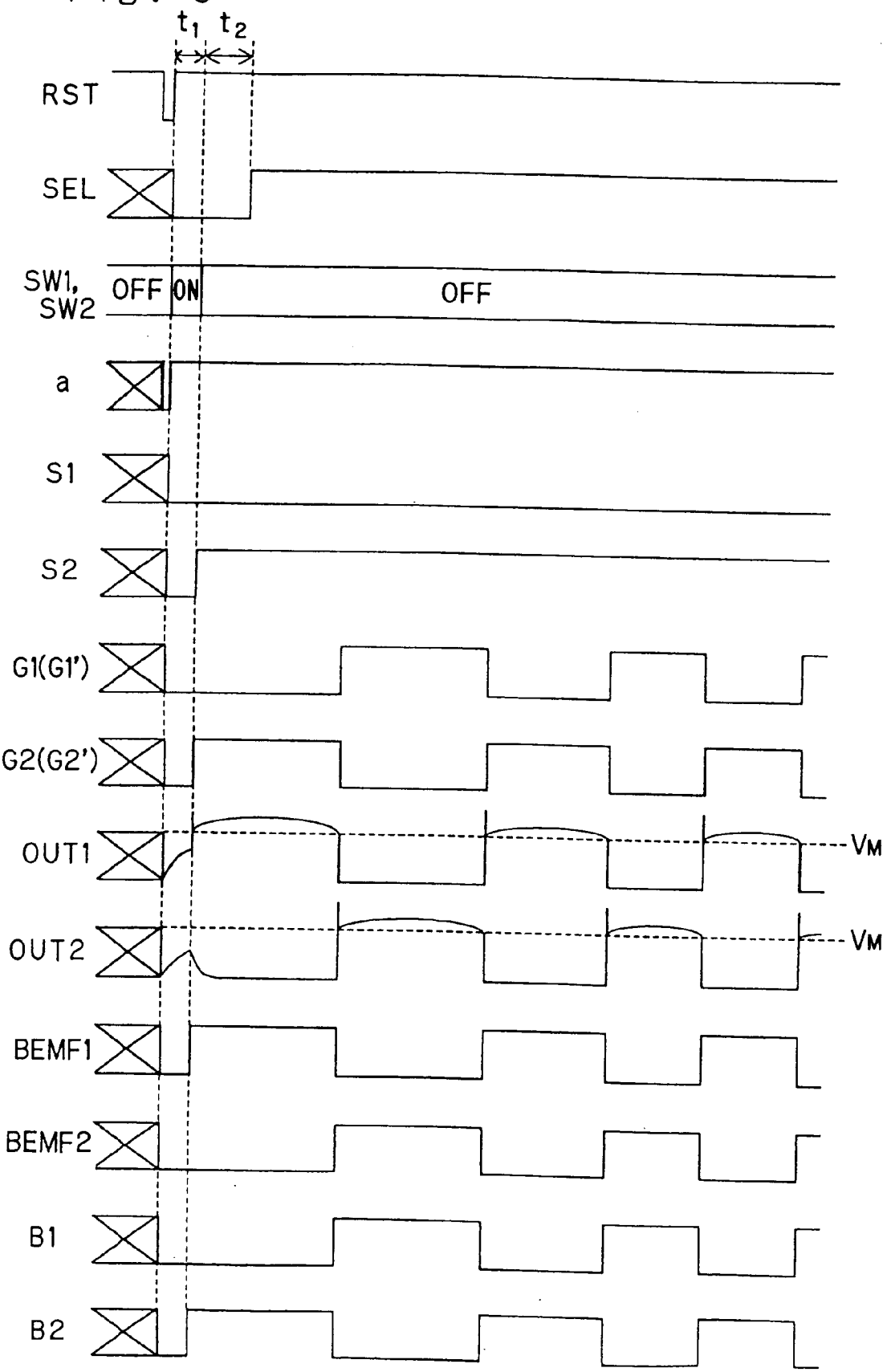
FIG. 9 is a timing chart of relevant signals observed when the motor is started, in a case where the rotor rest position detection portion is configured as shown in FIG. 7.

When the rotor rest position detection portion 8 configured as shown in FIG. 7 is used, relevant signals behave as shown in a timing chart in FIG. 9 when the motor M is started. When an internal reset signal RST rises as a result of power-on resetting, the starter portion 5 turns the select signal SEL to a low level, and turns the starting signals S1 and S2 to a low level. In addition, the starter portion 5 turns on the switches SW1 and SW2 of the rotor rest position detection portion 8 simultaneously, and keeps them on for a period of time $t_1$ so short as not to cause the rotor of the motor M to rotate.

Now, since the motor to be driven is structured as described earlier, in a case where the first-phase coil L1 is closer to the S pole of the rotor than the second-phase coil L2 is, the potential at the node P1 is lower than the potential at the node P2 in the rotor rest position detection portion 8, and thus the signal "a" output from the comparator 801 is at a low level. By contrast, in a case where the second-phase coil L2 is closer to the S pole of the rotor than the first-phase coil L1 is, the potential at the node P1 is higher than the potential at the node P2, and thus the signal "a" output from the comparator 801 is at a high level.

In the case shown in FIG. 9, the signal "a" output from the comparator 801 turns to a high level, meaning that the second-phase coil L2 is closer to the S pole of the rotor than the first-phase coil L1 is (the state shown in FIG. 5B). Thus, the starter portion 5 first keeps the select signal SEL at a low level, the starting signal S1 at a low level, and the starting signal S2 at a high level for a predetermined period of time $t_2$, and then turns the select signal SEL to a high level.

As a result, the transistor T2 of the output portion 4 turns on first, and thus the second-phase coil L2, which is closer to the S pole of the rotor, is energized first, causing the rotor to start rotating in the normal rotation direction. Thereafter, the turning on and off of the transistors T1 and T2 of the output portion 4 is controlled respectively by the back electromotive force drive signals B1 and B2, and thus which phase to energize is switched every time the voltage at the output point of the phase that is not being energized falls below the drive voltage $V_M$ for the motor M (more precisely, the threshold voltage of the corresponding comparator portion), in other words, substantially at zero-cross points of the back electromotive force appearing in the coil of the phase that is not being energized as the rotor rotates. Thus, the rotation of the motor is maintained.

By contrast, in a case where the signal "a" output form the comparator 801 turns to a low level, this means that the first-phase coil L1 is closer to the S pole of the rotor than the second-phase coil L2 is (the state shown in FIG. 5A). Thus, the starter portion 5 first keeps the select signal SEL at a low level, the starting signal S1 at a high level, and the starting signal S2 at a low level for a predetermined period of time $t_2$, and then turns the select signal SEL to a high level.

As a result, the transistor T1 of the output portion 4 turns on first, and thus the first-phase coil L1, which is closer to the S pole of the rotor, is energized first, causing the rotor to start rotating in the normal rotation direction. Thereafter, the turning on and off of the transistors T1 and T2 of the output portion 4 is controlled respectively by the back electromotive force drive signals B1 and B2, and thus which phase to energize is switched every time the voltage at the output point of the phase that is not being energized falls below the drive voltage $V_M$ for the motor M (more precisely, the threshold voltage of the corresponding comparator portion), in other words, substantially at zero-cross points of the back electromotive force appearing in the coil of the phase that is not being energized as the rotor rotates. Thus, the rotation of the motor is maintained.

After the motor M is started in this way, the operation of the comparator 801 of the rotor rest position detection portion 8 shown in FIG. 7 may be stopped. This helps reduce power consumption. In the rotor rest position detection portion 8 shown in FIG. 7, by inserting resistors respectively between the switch SW1 and the capacitor C1 and between the switch SW2 and the capacitor C2, it is possible to reduce the capacitances of the capacitors C1 and C2.

Now, still another practical example of the circuit configuration of the rotor rest position detection portion 8 will be described with reference to FIG. 10. Resistors R1 and R2 are connected respectively through switches SW11 and SW12 to the output point OUT1 of the first phase and the output point OUT2 of the second phase. The resistors R1 and R2 are given resistances so high that, even when the switches SW11 and SW12 are respectively turned on, the currents flowing therethrough are so low that the rotor does not rotate.

An operational amplifier 802 has its output terminal connected to its inverting input terminal (−) to form a buffer circuit. The non-inverting input terminal (+) of this operational amplifier 802 is connected to the node P11 between the switch SW11 and the resistor R1. An operational amplifier 803 forms a buffer circuit in the same manner as the operational amplifier 802, and the non-inverting input terminal (+) of this operational amplifier 803 is connected to the node P12 between the switch SW12 and the resistor R2.

The output of the operational amplifier 802 is subjected to level conversion by being passed through two inverter circuits 804 and 805, and is then fed to the data input terminal D of a D flip-flop circuit 808. The output of the operational amplifier 803 is subjected to level conversion by being passed through two inverter circuits 806 and 807, and is then fed to the clock input terminal CK of the D flip-flop circuit 808.

By using comparators instead of the operational amplifiers 802 and 803 individually forming buffer circuits, it is possible to omit the inverter circuits 804, 805, 806, and 807.

Figure 11:
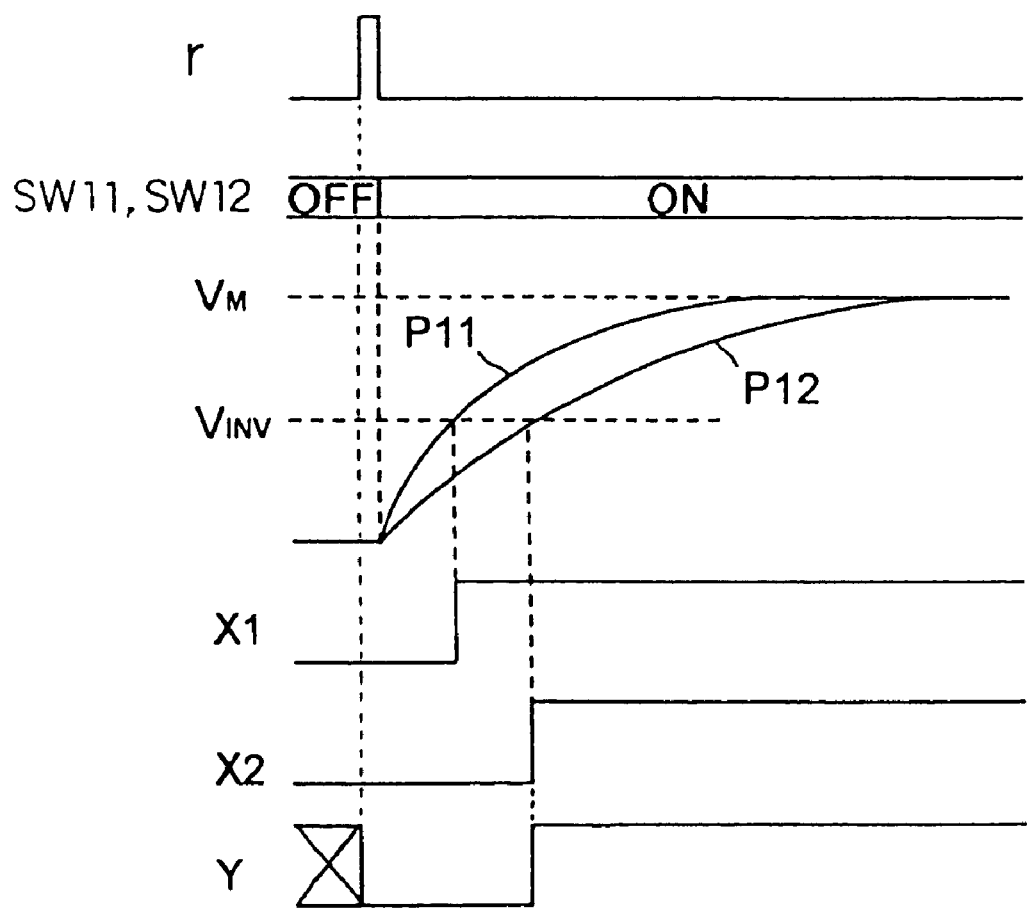
FIG. 11 is a diagram showing an example of status change that occurs at relevant points when the two switches are turned on simultaneously in FIG. 10.

Here, it is assumed that the coil of the phase that is being energized produces a magnetic field of the S pole. Then, whichever of the first-phase and second-phase coils L1 and L2 is closer to the S pole of the rotor has a higher apparent inductance, and therefore the current flowing through that coil varies more gently. Thus, in a case where the coil L2 is closer to the S pole of the rotor, when the switches SW11 and SW12 are turned on simultaneously, the potential at the node P12 rises more slowly than the potential at the node P11 as shown in FIG. 11. Thus, in the D flip-flop circuit 808, the signal X1 fed to the data input terminal D rises from a low level to a high level earlier than the signal X2 fed to the clock input terminal CK, and accordingly the signal Y output from the output terminal Q turns to a high level. In FIG. 11, $V_{INV}$ represents the threshold voltage of the inverter circuits 804, 805, 806, and 807.

By contrast, in a case where the coil L1 is closer to the S pole of the rotor, when the switches SW11 and SW12 are turned on simultaneously, the potential at the node P11 rises more slowly than the potential at the node P12. Thus, in the D flip-flop circuit 808, the signal X2 fed to the clock input terminal CK rises from a low level to a high level earlier than the signal X1 fed to the data input terminal D, and accordingly the signal Y output from the output terminal Q turns to a low level.

The turning on and off of the switches SW11 and SW12 is controlled by the starter portion 5. The signal Y output from the D flip-flop circuit 808 is fed to the starter portion 5. Before the motor M is started, the starter portion 5 turns the switches SW11 and SW12 on simultaneously, and, according to whether the signal Y output from the D flip-flop circuit 808 turns to a high or low level at this point, determines which of the first-phase and second-phase coils L1 and L2 to energize first to start the motor M. Specifically, when the signal Y turns to a high level, the starter portion 5 starts the motor M by energizing the second-phase coil L2 first; by contrast, when the signal Y turns to a low level, the starter portion 5 starts the motor M by energizing the first-phase coil L1 first.

Figure 10:
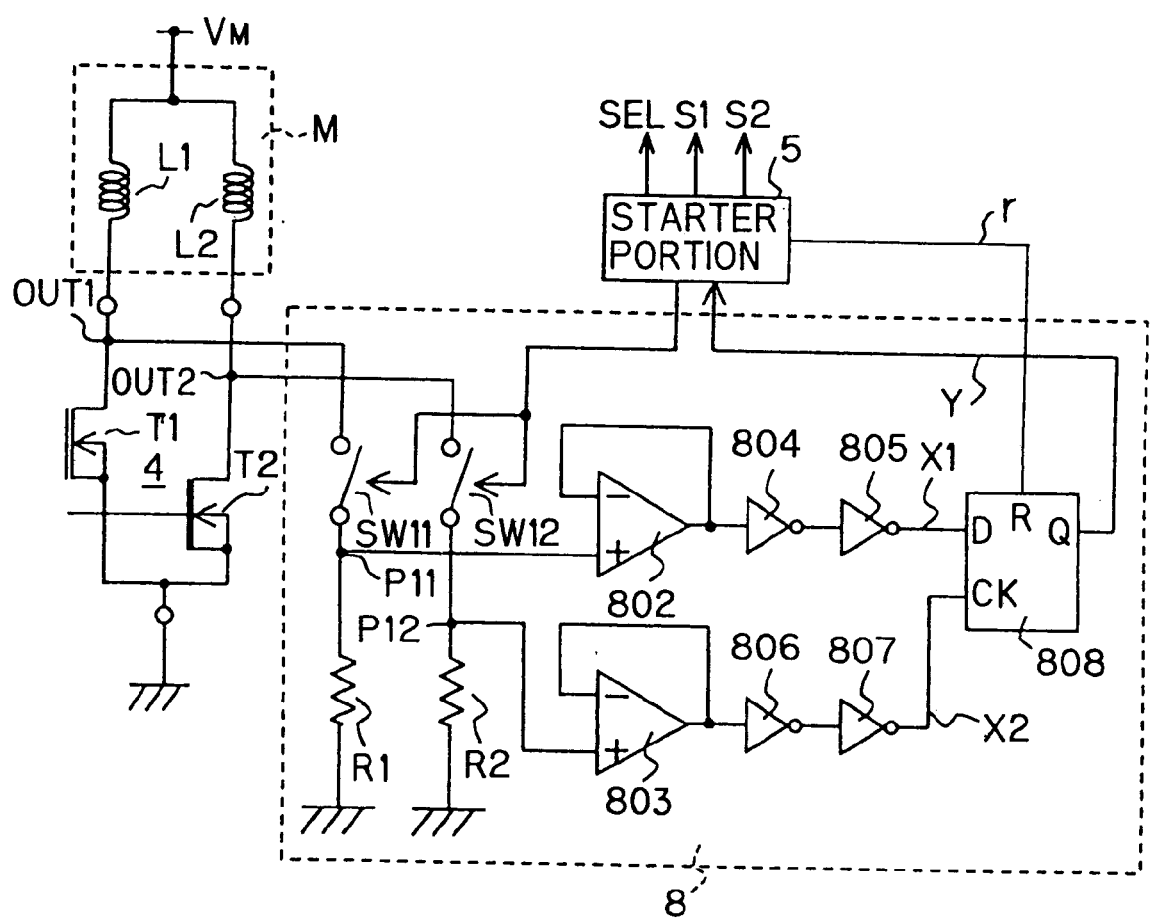
FIG. 10 is a diagram showing still another practical example of the circuit configuration of the rotor rest position detection portion.
Figure 12:
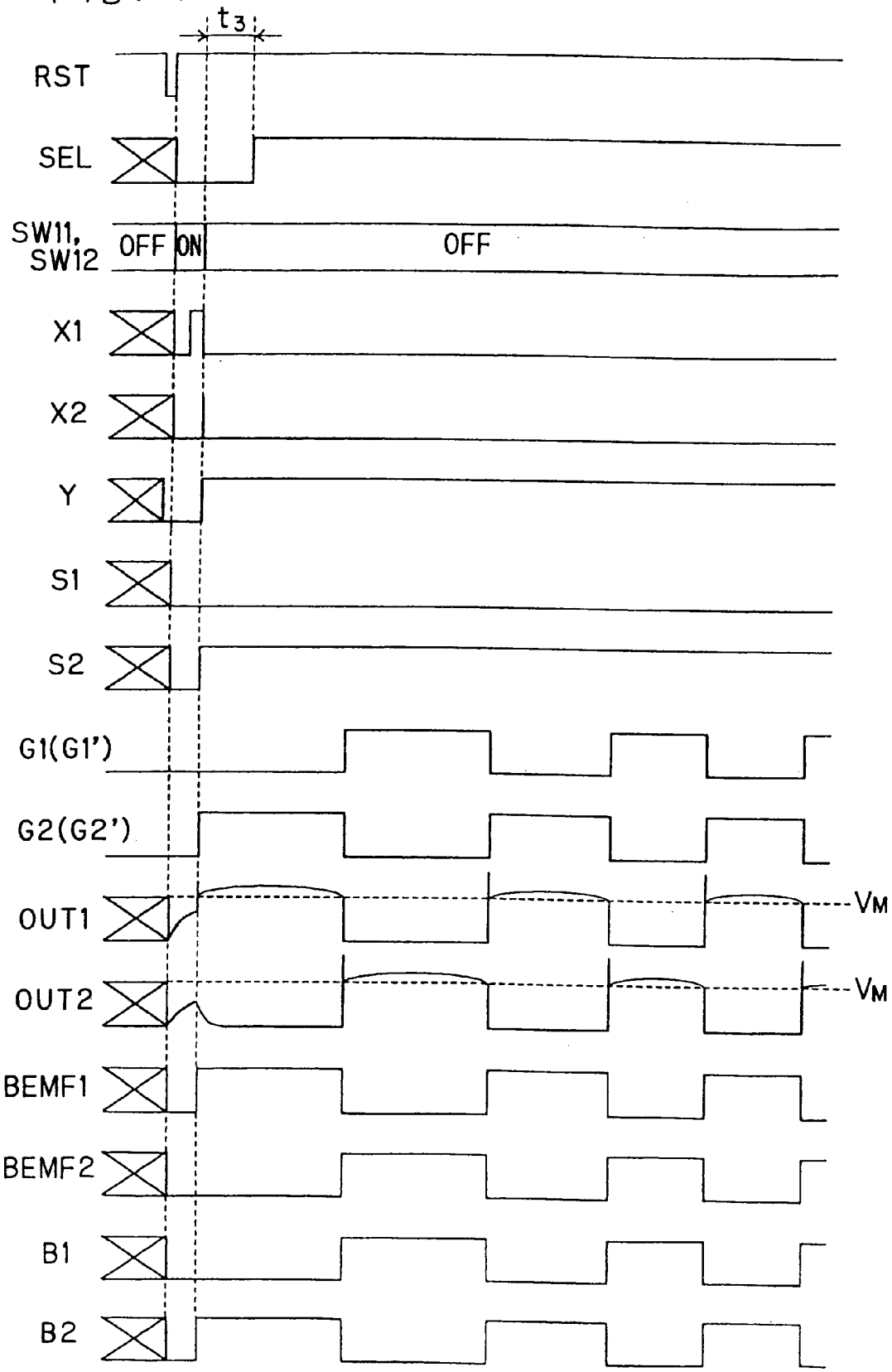
FIG. 12 is a timing chart of relevant signals observed when the motor is started, in a case where the rotor rest position detection portion is configured as shown in FIG. 10.

When the rotor rest position detection portion 8 configured as shown in FIG. 10 is used, relevant signals behave as shown in a timing chart in FIG. 12 when the motor M is started. When an internal reset signal RST rises as a result of power-on resetting, the starter portion 5 turns the select signal SEL to a low level, and turns the starting signals S1 and S2 to a low level. In addition, the starter portion 5 turns on the switches SW11 and SW12 of the rotor rest position detection portion 8 simultaneously.

Now, since the motor to be driven is structured as described earlier, in a case where the first-phase coil L1 is closer to the S pole of the rotor than the second-phase coil L2 is, in the D flip-flop circuit 808 of the rotor rest position detection portion 8 shown in FIG. 8, the signal X2 fed to the clock input terminal CK rises from a low level to a high level earlier than the signal X1 fed to the data input terminal D, and thus the signal Y output from the output terminal Q turns to a low level. By contrast, in a case where the second-phase coil L2 is closer to the S pole of the rotor than the first-phase coil L1 is, the signal X1 rises from a low level to a high level earlier than the signal X2, and thus the signal Y turns to a high level.

In the case shown in FIG. 12, the signal Y output from the D flip-flop circuit 808 turns to a high level, meaning that the second-phase coil L2 is closer to the S pole of the rotor than the first-phase coil L1 is (the state shown in FIG. 5B). Thus, the starter portion 5 first keeps the select signal SEL at a low level, the starting signal S1 at a low level, and the starting signal S2 at a high level for a predetermined period of time $t_3$, and then turns the select signal SEL to a high level. The switches SW11 and SW12 are turned off when both the signals X1 and X2 have turned to a high level.

As a result, the transistor T2 of the output portion 4 turns on first, and thus the second-phase coil L2, which is closer to the S pole of the rotor, is energized first, causing the rotor to start rotating in the normal rotation direction. Thereafter, the turning on and off of the transistors T1 and T2 of the output portion 4 is controlled respectively by the back electromotive force drive signals B1 and B2, and thus which phase to energize is switched every time the voltage at the output point of the phase that is not being energized falls below the drive voltage $V_M$ for the motor M (more precisely, the threshold voltage of the corresponding comparator portion), in other words, substantially at zero-cross points of the back electromotive force appearing in the coil of the phase that is not being energized as the rotor rotates. Thus, the rotation of the motor is maintained.

By contrast, in a case where the signal Y output from the D flip-flop circuit 808 turns to a low level, this means that the first-phase coil L1 is closer to the S pole of the rotor than the second-phase coil L2 is (the state shown in FIG. 5A). Thus, the starter portion 5 first keeps the select signal SEL at a low level, the starting signal S1 at a high level, and the starting signal S2 at a low level for a predetermined period of time $t_3$, and then turns the select signal SEL to a high level.

As a result, the transistor T1 of the output portion 4 turns on first, and thus the first-phase coil L1, which is closer to the S pole of the rotor, is energized first, causing the rotor to start rotating in the normal rotation direction. Thereafter, the turning on and off of the transistors T1 and T2 of the output portion 4 is controlled respectively by the back electromotive force drive signals B1 and B2, and thus which phase to energize is switched every time the voltage at the output point of the phase that is not being energized falls below the drive voltage $V_M$ for the motor M (more precisely, the threshold voltage of the corresponding comparator portion), in other words, substantially at zero-cross points of the back electromotive force appearing in the coil of the phase that is not being energized as the rotor rotates. Thus, the rotation of the motor is maintained.

After the motor M is started in this way, in the rotor rest position detection portion 8 shown in FIG. 10, the operation of the operational amplifiers 802 and 803, the inverter circuits 804, 805, 806, and 807, and the D flip-flop circuit 808 may be stopped. This helps reduce power consumption.

In practical terms, it is preferable that the rotor rest position detection portion 8 shown in FIG. 10 be provided with a switch connected between the node P11 and ground and a switch connected between the node P12 and ground so that these switches are turned on as required to ensure that the potentials at the nodes P11 and P12 have fallen to the ground level before the switches SW11 and SW12 are individually turned on. This permits the position in which the rotor is at rest to be detected with higher accuracy.

As described above, in this embodiment, before the motor is started, the position in which the rotor is at rest is detected by exploiting the fact that the coils of individual phases have varying apparent inductances according to the position in which the rotor is at rest; specifically, which of the first-phase and second-phase coils is closer to a predetermined magnetic pole (the same pole as that produced in the coil of the phase that is being energized) is detected. Then, according to the result of this detection, which phase to energize first when the motor is started is determined. This makes it possible to start the motor always in the same rotation direction, and thus to prevent reverse rotation of the motor.

Moreover, in this embodiment, which phase to energize is switched according to the back electromotive force appearing in the coil of each phase as the rotor rotates. This eliminates the need to use a hole element to detect the position of the rotor, and thus helps promote cost reduction and miniaturization.

Figure 13:
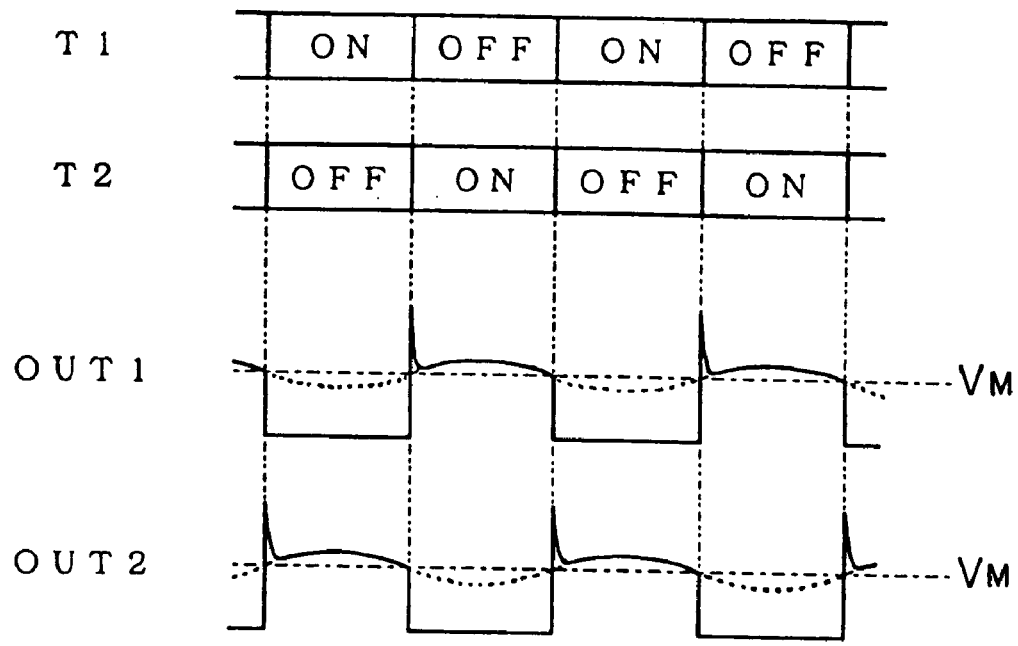
FIG. 13 is a diagram showing how a back electromotive force appears in the coil of each phase as the rotor rotates.

When the rotor is rotating, a magnet fixed to the rotor moves together, causing the magnetic flux passing through the coil of each phase to vary with time. Thus, a back electromotive force appears in the coil of each phase, and therefore the voltage at the output point of the phase that is not being energized has a waveform as shown in FIG. 13 with the back electromotive force superposed on the drive voltage $V_M$ for the motor M. The back electromotive force has a sinusoidal waveform that is synchronous with the rotation of the rotor, becoming equal to zero when the rotor is at an electrically stationary point. Therefore, it is possible to detect the position of the rotor according to the back electromotive force appearing in the coil of each phase. This makes it possible to rotate the rotor as smoothly as when a Hall element is used by, as described above, switching which phase to energize according to the back electromotive force appearing in the coil of each phase as the rotor rotates.

Moreover, in this embodiment, when the voltage at the output point of the phase that is not being energized drops below the drive voltage $V_M$ for the motor (in other words, when the back electromotive force appearing in the coil of the phase that is not being energized drops below zero), this serves as a trigger that causes the coil of the phase that has been energized thus far to stop being energized. As a result, a back electromotive force causes the voltage at the output point of the phase that has been energized to rise above the drive voltage $V_M$ for the motor (in other words, the back electromotive force appearing in the coil of the phase that has been energized rises above zero), and this serves as a trigger that causes the coil of the phase that has not been energized thus far to start being energized. Therefore, the first and second phases are never energized at the same time when which phase to energize is switched. This helps reduce power consumption, and ensures efficient rotation of the motor.

Figure 14:
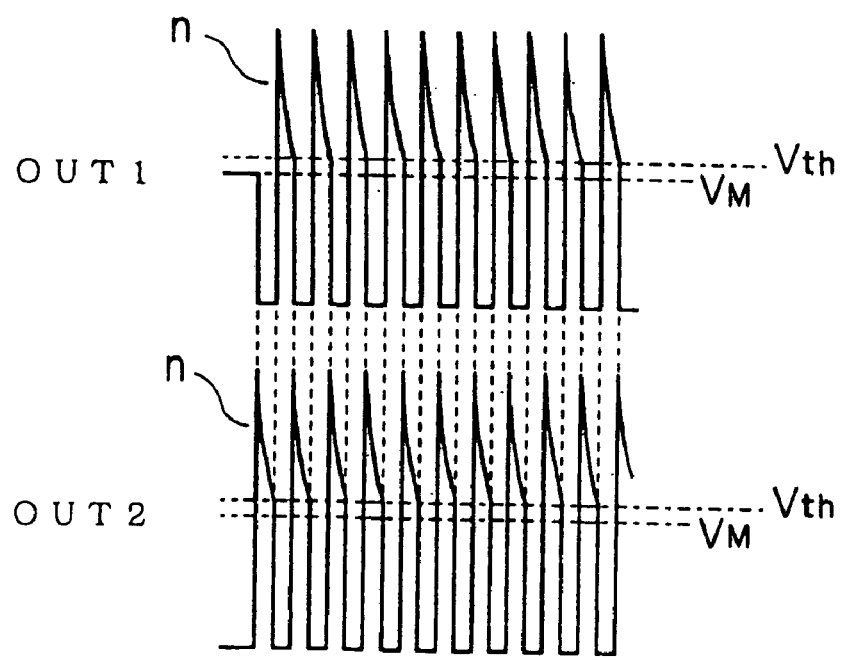
FIG. 14 is a diagram illustrating the problem that arises when the threshold voltages of the comparator portions are higher than the motor drive voltage.
Figure 15:
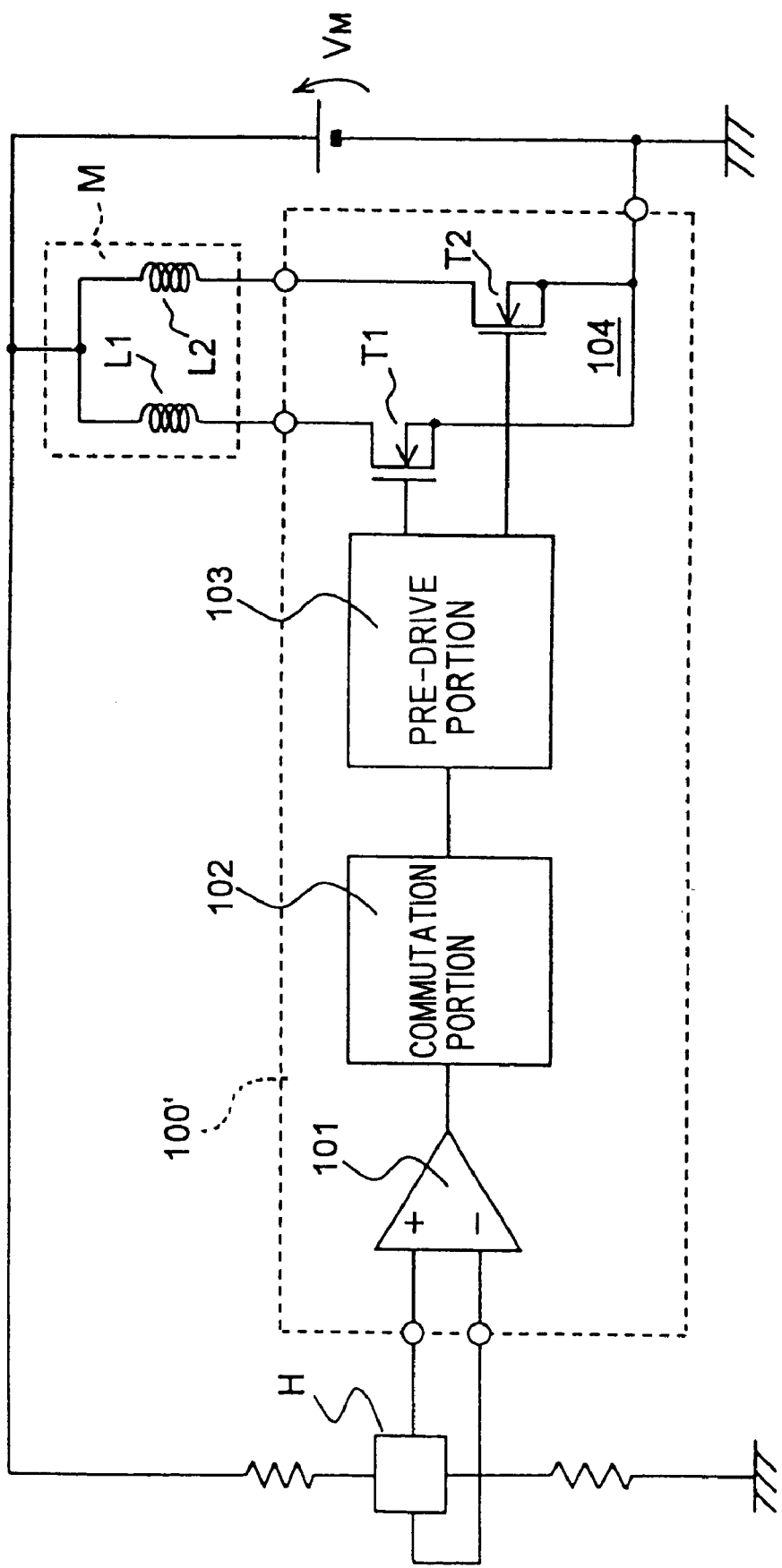
FIG. 15 is a block diagram of a conventional two-phase half-wave motor driving device.

In the voltages at the output points OUT1 and OUT2 of the first and second phases, spike noise "n" as shown in FIG. 14 appears when the coils of the first and second phases are respectively switched from an energized state to a de-energized state. Thus, if the threshold voltages $V_{th}$ of the comparator portions 1-1 and 1-2 are higher than the drive voltage $V_M$ for the motor M, even when the rotor is not rotating, the output signals BEMF1 and BEMF2 of the comparator portions 1-1 and 1-2 may vary, causing entry into the mode in which the back electromotive force drive signals B1 and B2 control the turning on and off of the transistors T1 and T2 constituting the output portion 4. In this state, as shown in FIG. 14, which phase to energize is switched so fast that the rotor does not rotate.

In this embodiment, however, the comparators 1-1 and 1-2 have the circuit configuration shown in. FIG. 2, and therefore, as long as variations in the base-emitter forward voltage of the transistors 11 and 14 are within tolerated limits (specifically, within the voltage drop across the resistor 12), the threshold voltages of the comparator portions 1-1 and 1-2 are never higher than the drive voltage $V_M$ for the motor M. This prevents the problem described above.

Setting the threshold voltage $V_{th}$ for the voltage appearing at the output point of the phase that is not being energized in such a way that it is never higher than the drive voltage $V_M$ for the motor M is equivalent, if the situation is put in other words as which phase to energize being switched when the back electromotive force appearing in the coil of the phase that is not being energized crosses a threshold level, to setting this threshold level in such a way that it is never higher than zero.

This embodiment deals with a case where the open end of the coil of the phase that is not being energized is on the current outflow side when this coil is energized. In a case where the open end of the coil of the phase that is not being energized is on the current inflow side when this coil is energized, the threshold level used to switch which phase to energize when the back electromotive force appearing in the coil of the phase that is not being energized crosses the threshold level is set in such a way as to be never lower than zero. This makes it possible to prevent the motor's failure to rotate resulting from spike noise appearing in the coil of each phase when the coil of each phase is switched from an energized state to a de-energized state.

In this embodiment, the comparator portions 1-1 and 1-2 use separate threshold voltages; however, they may use a common threshold voltage. The pre-drive portion 3 may be omitted by incorporating it in the commutation portion 2. The output portion 4 may be composed of npn-type bipolar transistors.

The embodiment described above deals with a case where a two-phase half-wave motor is driven. It is to be understood, however, that the present invention helps prevent reverse rotation of a motor also in cases where the motor is of a single-phase all-wave type, three-phase half-wave type, three-phase all-wave type, or any other type.

TABLE 1

| BEMF2 | 0 | 0 | 1 | 1 |
|---|---|---|---|---|
| BEMF1 | 0 | 1 | 0 | 1 |
| B1 | 0 | 0 | 1 | 0 |
| B2 | 0 | 1 | 0 | 0 |

What is claimed is:

1. A sensorless motor driving device for driving a motor by controlling energization of coils of individual phases of the motor according to a result of detecting a position of a rotor of the motor without using an external sensor, wherein, when the motor is at rest, the coils of the individual phases are energized with individual currents flowing in one direction to such a degree as not to cause the rotor to start rotating;

the position in which the rotor is at rest is detected by comparing how the individual currents flowing through the coils of the individual phases start up based on the varying apparent self-inductance of the coils of the individual phases depending on the position in which the rotor is at rest; and which of the individual phases to energize first, when the motor is started, is determined according to a result of detecting the position in which the rotor is at rest, wherein capacitors provided one for each phase are charged by allowing individual currents flowing in one direction to flow through the coils of the individual phases simultaneously, and how the individual currents flowing through the coils of the individual phases start up are compared on a basis of a relationship in magnitude among charge voltages of the capacitors of the individuals phases.

* * * * *